United States Patent [19]
Means

[11] 3,907,078
[45] Sept. 23, 1975

[54] BRAKE BEAM AND SECTIONALIZED BRAKE HEAD THEREFOR

[75] Inventor: Donald C. Means, Export, Pa.

[73] Assignee: Westinghouse Air Brake Company, Wilmerding, Pa.

[22] Filed: Feb. 19, 1974

[21] Appl. No.: 443,766

[52] U.S. Cl. ........ 188/222.1; 188/219.1; 188/233.7; 188/236; 188/243
[51] Int. Cl.² ......................................... B61H 13/36
[58] Field of Search .......... 188/219.1, 219.6, 222.1, 188/222.6, 223.1, 225.6, 226.1, 236, 243, 223.6, 224.1, 228.6, 229.1, 233.7

[56] References Cited
UNITED STATES PATENTS

| | | | |
|---|---|---|---|
| 649,568 | 5/1900 | Coolbaugh | 188/233.7 |
| 838,774 | 12/1906 | Crone | 188/236 |
| 2,747,264 | 5/1956 | Buvelot | 188/222.6 X |
| 2,958,398 | 11/1960 | Newell | 188/52 |
| 3,088,550 | 5/1963 | Kirk | 188/219.1 X |
| 3,088,557 | 5/1963 | Cabble, Jr. et al. | 188/236 X |

*Primary Examiner*—George E. A. Halvosa
*Attorney, Agent, or Firm*—W. F. Poore; R. W. McIntire, Jr.

[57] ABSTRACT

This invention relates to a novel brake beam that is slidably supported by a pair of guide feet, one integral with each end thereof, and has inboard of each guide foot a sectionalized brake-shoe-carrying brake lead thereby enabling replacement of one or more sections of a break head should breakage or wear of a removable section occur, thus effecting a substantial reduction in the cost of repairing a damaged or worn brake head. Furthermore, the structural configuration of this novel brake beam is such as to enable transversely mounting thereon a hydraulic-pneumatic master cylinder or some other suitable type of brake-beam-actuating cylinder, and also the mounting, adjacent each end of the cylinder, of a fulcrum means for a hand brake lever.

12 Claims, 8 Drawing Figures

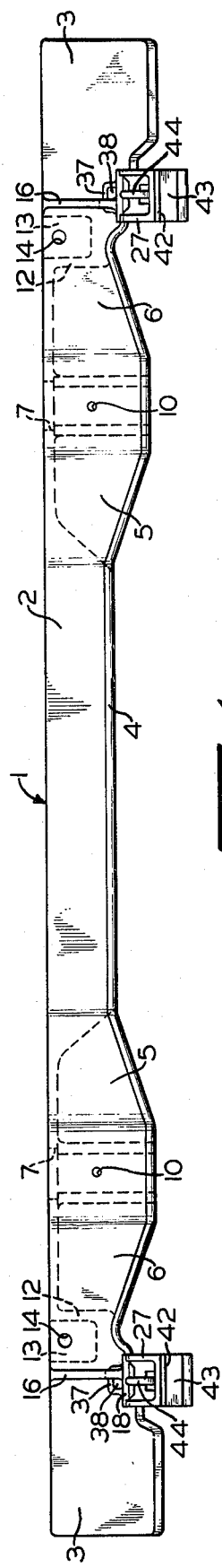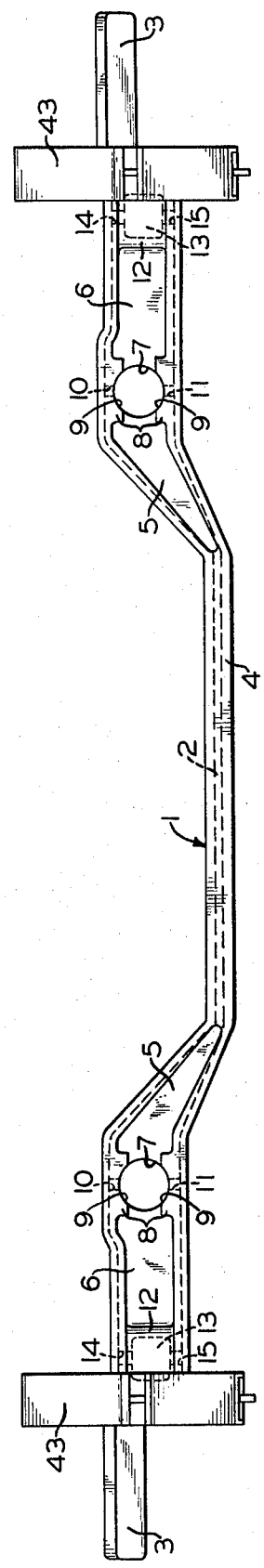

BRAKE BEAM AND SECTIONALIZED BRAKE HEAD THEREFOR

BACKGROUND OF THE INVENTION

In U.S. Pat. No. 2,958,398, issued Nov. 1, 1960 to George K. Newell, and assigned to the assignee of the present invention, there is shown a brake rigging embodying two brake beams on each of which is carried a brake cylinder, the axes of the cylinders being parallel to the longitudinal axis of a railway vehicle truck, and a lug upon which is pivotally mounted one end of a link of a hand brake linkage that includes a lever pivotally mounted intermediate its ends on the piston rod of the brake cylinder, one end of this lever being pivotally connected to the other end of the link and the other end connected through a cable to the usual hand brake wheel which is located at one end of a railway vehicle.

Since the longitudinal axes of the brake cylinders shown in U.S. Pat. No. 2,958,398 are parallel to the longitudinal axis of the truck, the length of these brake cylinders is limited to a value that is somewhat less than the distance between each brake beam and the adjacent axle of the vehicle truck. Therefore, the length of the bore in the casing of the brake cylinder cannot be of such magnitude as to provide sufficient travel for the brake cylinder piston, in addition to that required to effect contact of the brake shoes with the tread surface of the wheels, that, as the brake shoes wear away, the shoes are always properly moved into braking contact with the tread surface of the wheels of the truck during each brake application throughout their useful life without the necessity of a slack adjuster to compensate for wear of the shoes.

Accordingly, it is the general purpose of the present invention to provide a novel brake beam having at each end thereof and integral therewith a guide foot on the inboard side of which foot is a sectionalized brake-shoe-carrying brake head, the structural configuration of the brake beam between the sectionalized brake heads being such as to enable mounting thereon a cylinder device disposed transversely between the side frames of a railway vehicle truck, and on either side of this cylinder a fulcrum means for a hand brake lever.

SUMMARY OF THE INVENTION

According to the present invention, a novel brake beam has integral therewith at each end thereof a guide foot on the inboard side of each of which feet is a sectionalized brake head. The structural configuration of a portion of the brake beam extending between the two sectionalized brake heads is that of a T-beam to provide for the support thereon of a fluid motor or cylinder device of any desired type, the longitudinal axis of which is parallel to the longitudinal axis of the brake beam. Furthermore, the structural configuration of the novel brake beam constituting the present invention is such as to provide between each end of such a cylinder device and the adjacent brake head a pair of spaced-apart pockets or hollow bosses to enable connecting to the respective end of the brake beam both a power actuating means and also a hand brake lever.

In the accompanying drawings:

FIG. 1 is a plan or top view of a novel brake beam having adjacent each end thereof a sectionalized brake-shoe-carrying brake head.

FIG. 2 is a front elevational view of the brake beam shown in FIG. 1 showing certain structural details not made apparent in FIG. 1.

DESCRIPTION

Figure 3:
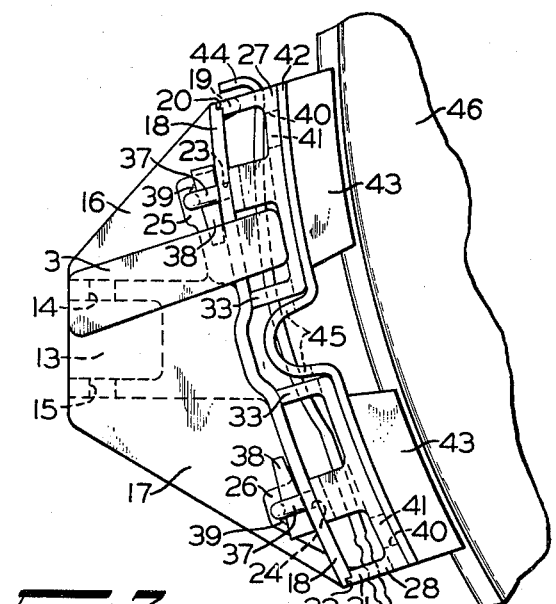
FIG. 3 is an end or side view of the brake beam shown in FIGS. 1 and 2 with a brake shoe secured to the sectionalized brake head by a brake shoe key.

As shown in FIGS. 1 and 2 of the drawings, a brake beam 1 has a center portion thereof that extends in opposite directions from a point midway its ends that has the shape of a T-beam. This portion of the brake beam 1 comprises an elongated flat surface 2 that is disposed substantially in a horizontal plane while a pair of guide feet 3 formed integral with the respective opposite ends of the brake beam 1 are slidably supported in a pair of grooved wear plate and guide members (not shown), these wear plate and guide members being secured to the two parallel spaced-apart side frames (not shown) of a railway vehicle truck. One side of the flat surface 2 is integral with a flange 4 midway the upper and lower edges of this flange, it being noted from FIGS. 1 and 2 that the height of this flange 4 is substantially less than the width of the flat surface 2.

A plurality of bores (not shown) may be formed, as by a drilling operation, in the flat surface 2 to enable a fluid motor or cylinder device (not shown) of any desired construction to be secured to the brake beam 1 in abutting relationship with the flat surface 2 by some suitable means such as, for example, bolts and nuts.

As shown in FIGS. 1 and 2, integral with each end of that portion of the brake beam 1 that has the shape of a T-beam is an inclined portion 5 that may be in the form of a cast U-channel member the cross-section of which varies from a minimum at the lower end that is integral with the flat surface 2 to a maximum at the upper end which is integral with an end section 6 that has the form of a cast U-channel member having a substantially constant cross-section. As can be seen from FIGS. 1 and 2, the upper and lower legs of the U-channel member constituting the inclined portions 5 each have an outturned flange that at the lower end of this portion 5 are integral with the flange 4 and at the upper end are integral with an outturned flange extending outward from the corresponding leg of the U-channel member constituting the respective end section 6.

By referring to FIG. 2 of the drawings, it is apparent that the two inclined portions 5 enable the elongated flat surface 2 to be disposed below the end sections 6. Therefore, after the above-mentioned fluid motor or cylinder device is secured to this flat surface 2 of the brake beam 1 and the guide feet 3 at the respective opposite ends of this beam are slidably supported in the pair of grooved wear plate and guide members that are secured to the two parallel spaced-apart side frames of one of a pair of railway vehicle trucks, the top of this fluid motor or cylinder will be disposed below the center sill of the railway vehicle body the opposite ends of which are supported by a pair of bolsters each end of each bolster resting on a spring interposed between the respective end and a side frame of one of the trucks.

As can be seen from FIGS. 1 and 2, the web that connects the upper and lower legs of the U-channel member constituting each end section 6 of the brake beam 1 is provided with a bore 7. As best shown in FIG. 2, formed on the upper and lower legs of the U-channel constituting each end section 6 are a pair of oppositely arranged and inwardly facing bosses 8. Each of these bosses 8 is provided with an arcuate bearing surface 9 the radius of which is one half of the diameter of the bores 7, it being understood that these arcuate bearing surfaces 9 are coaxial with the corresponding bore 7.

In order to provide for securing a hand brake lever (not shown) to either end of the brake beam 1, a cylindrical member that is formed on one end of a clevis (not shown) may be so disposed as to extend through either of the bores 7 and the corresponding coaxial arcuate surfaces 9 on the respective inwardly facing bosses 8.

Extending through the upper and lower legs of the U-channel member constituting each end section 6 are coaxial bores 10 and 11. The above-mentioned cylindrical member of the clevis is provided with a bore of substantially the same diameter as the bores 10 and 11 whereby this clevis may be secured to the brake beam 1 by such as, for example, a headed pin (not shown) that extends through this bore in the cylindrical member of the clevis and the corresponding bores 10 and 11 in the brake beam 1. The hand brake lever may be disposed between the jaws of the clevis and pivotally connected thereto by such as, for example, a headed pin (not shown) the opposite ends of which are anchored in the opposite jaws of this clevis.

As can be seen from FIGS. 1 and 2, each end section 6 is tapered and is wider at the end thereof adjacent the bosses 8 than at the opposite end where the upper and lower legs of the U-channel member constituting each end section 6 are integral with the upper and lower ends of a wall 12 that at one end is integral with the web that connects these upper and lower legs.

From FIGS. 1 and 2 of the drawings, it can be seen that each wall 12 constitutes one side or wall of one of a pair of identical cavities 13 provided in the brake beam 1. It is apparent from FIGS. 1 and 2 that each cavity 13 has five walls or sides and, as best shown in FIG. 1, is open at its upper side. Furthermore, as viewed in FIG. 2, the upper and lower walls of each cavity 13 are provided with coaxial bores 14 and 15, the bores 14 also appearing in FIG. 1.

Each of the cavities 13 provides for the insertion therein of one end of a piston rod or any other suitable beam-actuating member which may be operatively connected to the respective end of the brake beam 1 by such as, for example, a headed pin (not shown) that extends through the corresponding bores 14 and 15 and a coaxial bore provided therefor in the beam actuating member.

Figure 4:
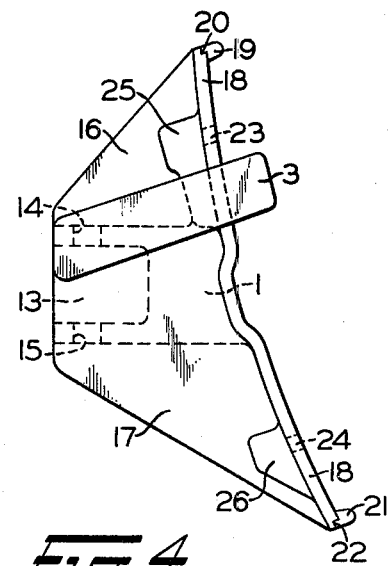
FIG. 4 is an end view of the brake beam shown in FIGS. 1 and 2 with the brake shoe and the detachable portions of the sectionalized brake head omitted.

As shown in FIGS. 1, 3 and 4, between each cavity 13 and the adjacent guide foot 3 is an upper longitudinal back flange or reinforcing web 16 of a sectionalized brake head hereinafter described, and a lower longitudinal back flange or reinforcing web 17 (FIGS. 3 and 4), only the upper web 16 appearing in FIG. 1. Each of these webs 16 and 17 is cast integral with the brake beam 1 and extends outward therefrom in a direction opposite that of the other, as is apparent from FIGS. 3 and 4. Furthermore, each of these webs 16 and 17 is also formed integral with a rim member 18, it being noted that this rim member 18 forms a right angle with the webs 16 and 17 and extends in opposite directions therefrom.

As best shown in FIGS. 3 and 4 of the drawings, the upper end of the rim member 18 has formed integral therewith and extending outward therefrom a brake shoe key stop 19 the width of which is less than the width of this rim member 18 thereby enabling the formation of a shoulder 20 in the rim member 18 adjacent each end of the stop 19, the purpose of these shoulders being hereinafter made apparent.

Likewise, the lower end of the rim member 18 has formed integral therewith and extending outward therefrom a brake shoe key locking lug 21 the width of which is also less than the width of this rim member 18 thereby enabling the formation of a shoulder 22 in the rim member 18 adjacent each end of the lug 21.

As can best be seen from FIG. 4, the rim member 18 is provided with a pair of openings or elongated slots 23 and 24. Formed in the upper web 16 and at the left-hand end of the slot 23, as viewed in FIG. 4, is a cavity 25, it being understood that this cavity extends through the web 16 from one side thereof to the other.

Likewise, formed in the lower web 17 is a cavity 26 that extends through this web 17 from one side to the other. The slots 23 and 24 and the cavities 25 and 26 enable securing to the rim member 18 a pair of identical and reversibly arranged detachable brake head members 27 and 28 (FIG. 3).

Figure 5:
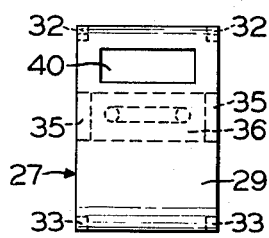
FIG. 5 is a front elevational view of one of the two identical detachable and replaceable members of the sectionalized brake head shown in FIGS. 1, 2 and 3.

Since the brake head members 27 and 28 are identical, a description of one will suffice for both. The front, side, and top views of the detachable brake head member 27 are shown respectively in FIGS. 5, 6 and 7 of the drawings. This brake head member 27 comprises a bowed rectangular element 29 having a concave surface 30 on one side thereof and a convex surface 31 on the opposite side.

Figure 6:
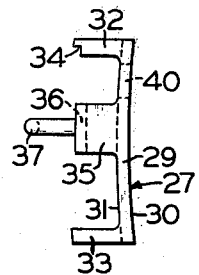
FIG. 6 is a side elevational view of the detachable member of the brake head shown in FIG. 5.
Figure 7:
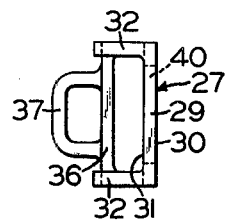
FIG. 7 is a top view of the detachable member of the brake head shown in FIG. 5.

As can be seen from FIGS. 6 and 7, integral with the respective opposite ends of the element 29 and extending outwardly from the convex surface 31 are an upper pair of spaced-apart legs 32 and a lower pair of spaced-apart legs 33 only one of these legs 32 and 33 appearing in FIG. 6. The outer end of each of the legs 32 is provided with a shoulder 34 which, when the detachable brake head member 27 is secured to the rim member 18, in a manner hereinafter described, abuts one of the shoulders 20, and, when the detachable brake head member 28 is secured to this rim member 18, abuts one of the shoulders 22, as can be seen from FIG. 3 which shows the detachable brake head members 27 and 28 secured to the rim member 18.

Formed integral with element 29 substantially midway the ends thereof and extending outwardly from the convex surface 31 is a third pair of parallel spaced-apart legs 35, one of which appears in FIG. 6. The outer ends of these legs 35 are integral with the respective opposite ends of a rectangular cross member 36.

As can best be seen from FIG. 7, formed integral with one side of the rectangular cross member 36 is one end of each leg of a U-shaped anchor member 37.

Figure 8:
FIG. 8 is a side view of a locking wedge by which each detachable member of a sectionalized brake head is secured to one of a pair of rim members that are formed integral with the brake beam.

After each of the detachable brake head members 27 and 28 are placed in the position in which the shoulder 34 on the legs 32 abut the shoulders 20 and 22 on the rim member 18, and the legs 33 abut this rim member 18 intermediate the ends thereof so that the U-shaped anchor member 37 of the brake head member 27 extends through the elongated slot 23 in the rim member 18, and the anchor member 37 of the brake head member 28 extends through the elongated slot 24 in this rim member 18, a tapered locking member or wedge 38, one of which is shown in FIG. 8, is inserted through each of the U-shaped anchor members 37, as shown in FIG. 3 of the drawings, on one side of the respective webs 16 and 17. Thereafter, each of these wedges 38 is tack welded to the respective U-shaped anchor member 37, as indicated by the reference numeral 39 in FIG. 3.

Should either or both of the detachable brake head members 27 or 28 become damaged from any cause, such as, for example, in a derailment or other railway accident, the defective brake head member or members may be removed by first imparting a hammer blow to the smaller end of the respective wedge 38 of such magnitude as to rupture the corresponding tack weld 39.

Subsequent to rupture of the tack weld 39, the wedge 38 may be withdrawn from the corresponding U-shaped anchor member 37.

Thereafter, the defective detachable brake head member 27 or 28 or both of these members are moved in the direction away from the rim member 18 until the corresponding U-shaped anchor member or members 37 are withdrawn from the respective slot or slots 23 and 24.

Subsequently, the defective detachable brake head member or members are replaced by a new brake head member which is secured to the rim member 18 by the previously used wedge 38 if it has not been damaged or bent until unfit for use.

Each of the detachable brake head members 27 and 28 is provided with a rectangular opening 40 for receiving one of a pair of rejection lugs 41 (FIG. 3) formed on a backing plate 42 of a composition type brake shoe 43 that is secured to the detachable brake head members 27 and 28 by a brake show key 44. This key 44, as shown in FIG. 3, extends downward between the legs 32, 33 and 35 of each of the detachable brake head members 27 and 28 and through a slot 45 provided therefor in the backing plate 42. The lower end of the brake shoe key 44 is provided with a plurality of serrations. Consequently, when the brake shoe key 44 is driven downward to the position shown in FIG. 3 by a series of hammer blows applied to its upper end, the brake shoe key locking lug 21 will be disposed in one of these serrations thereby preventing movement of this brake shoe key 44 as the result of vibration while a train is traveling at a fast speed.

Since the rejection lugs on a cast iron type brake shoe are in different positions than the rejection lugs on a compositon type brake shoe, it is apparent that a cast iron type brake shoe cannot be secured to the detachable brake head members 27 and 28.

It will be understood of course that it is desirable to provide a brake beam that uses cast iron type brake shoes with detachable brake head members that are provided with openings so located as to receive therein the rejection lugs on cast iron type shoes. However, in order to prevent the application of these detachable brake head members that are adapted to receive cast iron type brake shoes to a brake beam and which composition type brake shoes are to be used, the design of the means by which these detachable brake head members are secured to the rim member 18 must be different than that shown and described for the present invention. With such different designs of securing means, it would not be possible to secure detachable brake head members suitable for receiving cast iron type brake shoes in a brake beam designed to receive detachable brake head members suitable for receiving composition type brake shoes and vice versa.

It will be understood that when one end of a piston rod or other suitable beam-actuating member is inserted in each of the cavities 13 (FIGS. 1 and 2) in the brake beam 1 and operatively connected thereto, this brake beam 1 may be moved by the application of equal forces to these actuating members so that the pair of brake shoes 43 carried by this brake beam 1, one adjacent each end thereof, are moved into braking contact with the tread surface of the corresponding one of a pair of wheels 46, one of which is shown in FIG. 3 of the drawings.

Having now described the invention what I claim as new and desire to secure by Letters Patent is:

1. A brake beam for a railway vehicle truck comprising:
   a. a brake-head-carrying member having formed integral therewith adjacent each end thereof a pair of oppositely extending webs, wherein the improvement comprises:
   b. a pair of brake-head-receiving rim members, one side of each of which is formed integral with one pair of said webs,
   c. two pairs of separate detachable brake-shoe-carrying brake head members one pair for each of said rim members, and
   d. readily releasable locking means for securing each separate detachable brake-shoe-carrying brake head member of each pair of members to and thereafter enabling its detachment from a corresponding one of said rim members independently of the other brake head member secured to said corresponding one rim member.

2. A brake beam for a railway vehicle truck, as recited in claim 1, further characterized in that said brake-headcarrying member comprises:
   a. a T-beam extending a substantial distance in opposite directions from a point midway the length of said brake beam, said T-beam having a pair of flanges each of uniform thickness and width, one of which is integral with the other substantially midway the edges thereof and forms a right angle therewith, said one flange being substantially wider than the other to enable mounting thereon a brake-beam-actuating means.

3. A brake beam for a railway vehicle truck, as recited in claim 2, further characterized in that one pair of said oppositely extending webs and one of said pair of brake-head-receiving rim members are disposed adjacent each end of said T-beam and integrally connected therewith.

4. A brake beam for a railway vehicle truck, as recited in claim 1, further characterized in that each of said pair of brake-head-receiving rim members is provided at its respective opposite ends with a stop member integral therewith and extending from the other side thereof, and with a shoulder formed therein adjacent each end of each of said stop members, each stop member and the shoulders adjacent the respective opposite ends thereof serving to position the corresponding detachable brake-shoe-carrying brake head member relative to one of said brake-head-receiving rim members.

5. A brake beam for a railway vehicle truck, as recited in claim 1, further characterized in that each of said brake-head-receiving rim members is provided with a pair of parallel spaced-apart elongated slots and said releasable locking means comprises:
  a. a hollow locking element integral with said detachable brake-shoe-carrying brake head member in such a position and being of such length as to be disposed in and extend beyond one of said elongated slots, the width of said hollow locking element being substantially greater than the width of said oppositely extending webs that are integral with said brake-head-carrying member, and
  b. a tapered locking member of such size as to be so disposed in that portion of said hollow locking element extending beyond said one elongated slot as to abut both said one side of said brake-headreceiving rim member and one side of one of said pair of oppositely extending webs whereby said detachable brake-shoe-carrying brake head member is detachably secured to said brakehead-receiving rim member.

6. A brake beam for a railway vehicle truck wherein the improvement comprises:
  a. a T-beam extending a substantial distance in opposite directions from a point midway the length of said brake beam,
  b. a first pair of U-shaped channel members each integral at one end with one end of said T-beam and forming an obtuse angle therewith, each U-shaped channel member having a pair of legs and an integral web connecting one end of one leg with the corresponding and of the other leg, one end of said legs and said web being integral with the corresponding end of said T-beam, and said legs extending divergently therefrom,
  c. a second pair of U-shaped channel members having a pair of parallel spaced-apart legs and an integral web connecting one end of one leg with the corresponding end of the other leg, one end of said legs and said web of each of said second pair of U-shaped channel members being respectively formed integral with the other end of said divergently extending legs and said web of a corresponding one of said first pair of U-shaped channel members, and
  d. a pair of spaced-apart bosses each formed integral with each of said legs and the corresponding web of one of said second pair of U-shaped channel members on the side thereof adjacent the other leg and coaxial with the spaced-apart boss on the other leg, each pair of bosses and the corresponding web being provided with a bore extending therethrough, the axis of which bore is parallel to said legs, said bore enabling mounting therein such as a cylindrical member integral with one end of a clevis constituting a hand brake lever fulcrum means.

7. A brake beam for a railway vehicle truck, as recited in claim 6, further characterized in that said pair of parallel spaced-apart legs of each of said second pair of U-shaped channel members are connected by three walls two of which are parallel and form a right angle with one end of the third whereby said three walls form a cavity, and said pair of legs are each provided with a bore opening at one end into said cavity and coaxial with the bore in the other leg whereby each cavity enables the provision of an operating connection between said brake beam and one of a pair of brake-beam-actuating members disposed in one of said cavities.

8. A brake beam for a railway vehicle truck, as recited in claim 6, further characterized by a pair of rim members each having a pair of spaced-apart webs formed integral respectively with one of said parallel legs of the corresponding one of said second pair of U-shaped channel members, and by a pair of separate detachable brake-shoe-carrying brake head members removably secured to each of said rim members.

9. A brake beam for a railway vehicle truck, as recited in claim 8, further characterized in that each of said rim members is provided with a pair of parallel spaced-apart elongated slots, and each of said detachable brake-shoecarrying brake head members has an anchor member formed integral therewith intermediate the ends thereof in such a position as to be disposed in one of said slots and anchored to the corresponding rim member.

10. A brake beam for a railway vehicle truck, as recited in claim 9, further characterized in that said anchor member comprises:
  a. a first pair of legs each integral at one end with said detachable brake head member intermediate the ends thereof,
  b. a cross member integral at its respective opposite ends with the other end of said pair of legs,
  c. a U-shaped member having a pair of spaced-apart legs each integral at one end with said cross member, said cross member and said U-shaped member being so disposed that said cross member abuts one side of said rim member and said U-shaped member is disposed in one of said elongated slots in said rim member, and
  d. a wedge receivable in said U-shaped member and disposed on one side of the corresponding one of said pair of spaced-apart webs in abutting relationship therewith and with the other side of said rim member.

11. A brake beam for a railway vehicle truck, as recited in claim 9, further characterized in that each of said detachable brake-shoe-carrying brake head members further comprises two pair of spaced-apart legs, one end of the legs of one pair being formed integral with one end of said brake head member and the corresponding end of the legs of the other pair being formed integral with the other end of said member, the other end of each of said one pair of legs being provided with a shoulder, and each of said rim members is provided at the respective opposite ends thereof with a pair of spacedapart shoulders, the shoulders at one end receiving in abutting relationship therewith the shoulders on the other end of said one pair of legs of one of said detachable brake-shoe-carrying brake head members, and the shoulders at the opposite end receiving in abutting relationship therewith the shoulders on the other end of said one pair of legs of the other of said detachable brake-shoe-carrying brake head members, whereby said brake head members are oppositely arranged relative to said rim member.

12. A brake beam for a railway vehicle truck as recited in claim 8, further characterized by a pair of guide feet, each of said guide feet being formed integral with a corresponding one of said rim members and one side of one of said pair of spaced-apart webs.

* * * * *